United States Patent Office 2,836,547
Patented May 27, 1958

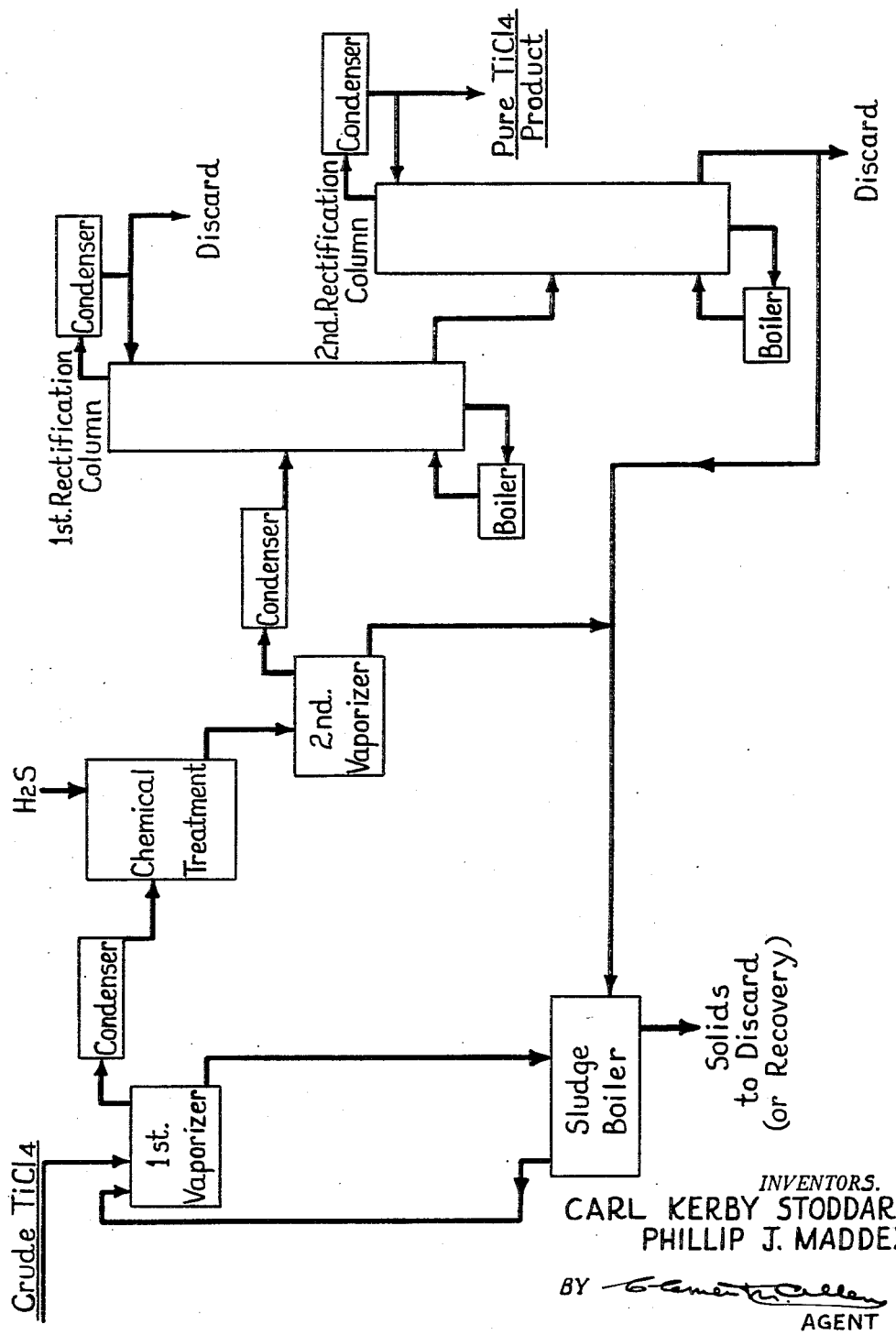

2,836,547

PURIFICATION OF TITANIUM TETRACHLORIDE

Carl Kerby Stoddard, Henderson, and Phillip J. Maddex, Las Vegas, Nev., assignors to Titanium Metals Corporation of America, Pittsburgh, Pa., a corporation of Pennsylvania Application June 21, 1954, Serial No. 437,914

6 Claims. (Cl. 202—57)

This invention relates to the purification of titanium tetrachloride and more particularly to the treatment of crude titanium tetrachloride to produce purified material suitable for the manufacture of titanium metal.

Methods for purification of titanium tetrachloride to produce raw material for pigment production are well known. It has been necessary in order to produce proper quality pigment to insure that tetrachloride used for this purpose is water-white and contains no impurities which would harm the paint making or color characteristics of $TiO_2$ manufactured from it. The problems involved in the manufacture of titanium metal, however, are different. Impurities which apparently have no deleterious effect on pigment production have been found to render titanium tetrachloride unsuitable for the production of ductile titanium metal. The effect and permissible amounts of some of these impurities are not completely appreciated even at this time, however, it is known that phosgene, free chlorine and solid material which may contain oxidic compounds as well as vanadium salts, which are often present in titanium ores, are definitely harmful. It has not been possible by heretofore known methods to treat titanium tetrachloride continuously and efficiently to produce a raw material which will insure the production of ductile metal.

It is therefore the object of this invention to provide an improved method for the purification of titanium tetrachloride. Another object of this invention is to provide a method for producing purified titanium tetrachloride of a grade suitable for the production of ductile titanium metal. Still another object of this invention is to provide a continuous, efficient and economical method for the purification of titanium tetrachloride. Yet another object is to provide a method for purification of titanium tetrachloride which will separate harmful gaseous as well as solid and soluble impurities. This and other objects of this invention will be apparent from the following more detailed description thereof and from the annexed drawing which illustrates a general flow sheet of a preferred embodiment of the method of this invention.

Referring now to the drawing, the crude $TiCl_4$ as it is transferred from the chlorinators is first subjected to a vaporization treatment. The vapors pass out of the vaporizer and are condensed, the residual solids being transferred to a sludge boiler for recovery of $TiCl_4$ values as will be hereinafter described in more detail. The condensed $TiCl_4$ which at this stage will have been freed from non-volatile solid impurities is then treated with a chemical treating agent capable of precipitating soluble compounds such as vanadium salts. This chemical treating agent may preferably be $H_2S$ or any one of a number of compounds which have been proposed in the prior art, for instance, metallic copper, carbon, oils and organic compounds. It is preferred to conduct the chemical treatment at elevated temperature and sufficient treating agent is added to insure as complete as possible precipitation of vanadium and like impurities. As a control, the $TiCl_4$ at this stage may be analyzed for vanadium content, or a water-white color may be taken as an indication of adequate treatment. After treatment, the treated $TiCl_4$ is transferred to a second vaporizer to distill off the titanium tetrochloride from the precipitated solids. The vapors from the second vaporization stage are condensed and the residue from this operation is transferred to the sludge boiler.

The condensed and treated $TiCl_4$ is then transferred to the first rectifying column which separates the low boiling impurities from the $TiCl_4$. The column is maintained in operation by provision of a boiler which vaporizes $TiCl_4$ at or near its base and the separated low boiling point impurities volatilized at the top of the column are refluxed and discarded. The $TiCl_4$ taken from the bottom of the column freed from low boiling point impurities is then passed to a second rectifying column where high boiling point impurities are separated. This column is of the same general nature as the first rectifying column but operated so that purified $TiCl_4$ will be drawn off at the top of the column and the high boiling point impurities will be taken from the bottom of the column. A boiler is provided to continuously vaporize $TiCl_4$ for proper column operation. The purified $TiCl_4$ product taken from the top of the second column is condensed and will be found of purity suitable for the manufacture of ductile metallic titanium. The high boiling point impurities taken from the bottom of the second rectifying column will feed back into the sludge boiler with a proportion thereof being separated and discarded.

The sludge boiler as noted above receives the residue material from the first vaporizer, the second vaporizer, and a proportion of the high boiling point impurities from the second rectifying column. Since all these materials will contain a substantial proportion of $TiCl_4$, the sludge boiler is operated to separate $TiCl_4$ from solids and other impurities. Operation is accomplished by a simple volatilization, the solid titanium residue being discarded and the $TiCl_4$ vapors condensed, preferably, and then fed back into the first vaporizer. The flow sheet therefore, illustrates a complete integrated, continuous process for purifying $TiCl_4$ with values recovered as far as possible from separated impurities.

The crude $TiCl_4$ as received from the chlorinators, as it enters the system described, may contain a number of harmful solid and gaseous impurities. These may include dust, finely divided particles of the chlorinator feed materials such as carbon and rutile or ilmenite, iron compounds, vanadium compounds, free chlorine, phosgene, HCl, tin chloride, silicon chloride, zirconium chloride, chromium chlorides, as well as other impurities. The first vaporization step is not essential in the process and if desired the crude $TiCl_4$ may be transferred directly to the chemical treatment step. It is advantageous, however, to employ a preliminary vaporization in order to separate the solid impurities from the $TiCl_4$ before chemical treatment. It has been found that a considerably increased amount of chemical treating agent is necessary to produce properly treated $TiCl_4$ when the solid impurities are allowed to remain in the $TiCl_4$. The first vaporizer is operated so that a major portion of the crude $TiCl_4$ is distilled over into the following condenser. It is not desirable at this stage to conduct the evaporation so as to produce a dry residue but better operating conditions will be obtained if a portion of $TiCl_4$ remains with the solid impurities so that a liquid slurry is produced in the still bottom which may be readily handled by ordinary transfer pipes and pumping equipment. It will be found convenient and advantageous to operate the first vaporization so that between 50 and 80% of the $TiCl_4$ content of the crude feed is evaporated and condensed.

The chemical treatment operation is conducted in accordance with best practice considering the amount of impurities precipitated and the nature of the chemical treating agent employed. $H_2S$ is a preferred treating agent and when this is used, sufficient is added to the $TiCl_4$ to produce a water-white product substantially free from vanadium compounds. In the chemical treatment a substantial amount of precipitation of impurities occurs, in addition to coagulation of finely divided suspended material. Therefore in order to provide a conveniently handled still bottom material the second vaporization step like the first is not carried to the point where a dry residue is obtained. A major part, preferably 50 to 80%, of the $TiCl_4$ at this stage is distilled over into the following condenser. The residue material which is fluid by reason of the amount of $TiCl_4$ still present in admixture with the solids will be found to be conveniently transferred to the sludge boiler employing ordinary pipes and pumping equipment.

If desired, condensation of the vapors from the second vaporization step may be omitted and the vapors transferred directly to the first rectifying column. It has been found however that somewhat better control of the column operation is obtained when the feed material is first condensed. The fractional distillation which is accomplished in the first rectifying column is arranged by application of known principles. The amount of heat applied in the boiler is adjusted to produce the desired rate of vaporization of $TiCl_4$ and at the top of the column a proportion of condensed low boiling point compounds is recycled back to the tower. The reflux ratio, that is the ratio of material returned to the tower to that removed at this point, may vary widely according to the design and construction of the column. Good separation of low boiling point compounds has been obtained with reflux ratios within the range between 10 to 1 and 80 to 1.

The $TiCl_4$ drawn off the bottom of the first rectification column is transferred and subjected to a second fractional distillation operation to separate it from high boiling point compounds in the second rectifying column. This column is operated also according to known principles with sufficient heat being applied to the $TiCl_4$ boiler to provide proper amounts of $TiCl_4$ vapor in the tower. As in the first rectification column the reflux ratio may vary considerably but good results have been obtained with reflux ratios within the range between ½ to 1 and 10 to 1.

Continuous and economical operation of the rectification columns does not produce perfectly separated high or low boiling components. Employing proper reflux ratios the low boiling fraction taken from the top of the first rectification column comprises tin chloride, silicon chloride, and other compounds and gases whose boiling point is lower than that of $TiCl_4$. In general and under conditions where an optimum reflux ratio is employed, the proportion of $TiCl_4$ admixed with these low boiling point compounds will not be of large magnitude. Therefore with reasonable control of the reflux ratio and the column operating conditions, the low boiling point vaporization from the top of the first rectifying column may be discarded without serious loss of $TiCl_4$.

The second rectification step produces purified titanium tetrachloride but operation of this column cannot be generally adjusted to provide a sharp fractionation of high boiling point components. Therefore, the reflux ratio is adjusted to produce the desired purity in the $TiCl_4$ taken from the top of the column, and the high boiling point fraction separated at the bottom of the column under most conditions will contain a substantial proportion of $TiCl_4$. Therefore, this material is recycled back to the sludge boiler for recovery of $TiCl_4$ in the same manner that the still bottoms from the first and second evaporation steps are handled. A proportion of the high boiling point compounds in admixture with $TiCl_4$ should be continually removed from the material being transferred from the bottom of the second rectifying column to the sludge boiler so that continual build up of high boiling point components in the over-all system is avoided. Bleeding off a reasonable portion so that only a minor amount of $TiCl_4$ is discarded with the unwanted high boiling point components will be found to provide adequate control of the high boiling point content of the whole system.

The sludge boiler, which is in effect a recovery unit for separating valuable $TiCl_4$ from the first and second evaporation steps and from the second rectifying column, is operated to produce recovered $TiCl_4$ and a solid dry residue which can be discarded or if desired may be treated to recover metal values, such as vanadium and zirconium therefrom. The slurries entering the sludge boiler are best handled in batches and the temperature of the sludge boiler is held above the boiling point of $TiCl_4$. The recovered $TiCl_4$ from the sludge boiler may be combined with crude $TiCl_4$ at any stage prior to chemical treatment but is preferred to carry this material back to the first evaporation stage so that any solids carried over in the sludge baking operation will be separated before the recovered $TiCl_4$ is admixed with treating agent. If desired, and particularly if values are to be recovered from the residues, slurries from the various steps may be treated separately for recovery of $TiCl_4$ which is recycled as described.

The integrated process as hereinbefore described provides a continuous method for producing titanium tetrachloride of highest purity. The sequence and arrangement of steps are important to insure the required purity in the final product. Although the reasons for some effects encountered in such a system are not precisely known it has been discovered that final $TiCl_4$ purity is improved substantially over that obtained by heretofore known methods. The chemical treating agent employed apparently is much more efficient in precipitating vanadium salts and other contaminants when the crude $TiCl_4$ has first been separated from residual solids and suspended matter by a preliminary evaporation step. Moreover, under these conditions substantial saving may be accomplished inasmuch as an appreciably lower amount of treating agent will accomplish the same effect.

The arrangement and sequence of the rectifying columns may be considered contrary to preferred present practice employed in other industries. Separation of the low boiling compounds in the first step does not provide a clean feed to the second column as may be ordinarily considered more desirable. However, it has been discovered that titanium tetrachloride is extremely sensitive to the presence of finely divided solids which may build up and be formed at any stage of such a treatment procedure. Therefore, the disadvantage of a dirty distillation in the second rectifying column is more than compensated for by the advantage of taking the $TiCl_4$ product off as a vapor in the final step and only a simple condensation is required to produce liquid $TiCl_4$ for direct use.

We claim:

1. A process for the purification of crude titanium tetrachloride ($TiCl_4$) which comprises evaporating said crude $TiCl_4$ to separate solid and non-volatile materials therefrom, precipitating vanadium and other impurities from said evaporated $TiCl_4$ by means of a chemical treating agent, evaporating said treated $TiCl_4$ to separate non-volatile precipitates therefrom, removing low boiling point impurities from said treated and evaporated $TiCl_4$ by a first fractional distillation and removing high boiling point impurities therefrom by a second fractional distillation, thereby to produce purified $TiCl_4$.

2. A process for the purification of crude titanium tetrachloride ($TiCl_4$) which comprises evaporating a major portion of said crude $TiCl_4$ to separate a minor portion thereof containing non-volatile solid materials, precipitating vanadium and other impurities from said evaporated TiCl$_4$ by means of a chemical treating agent, evaporating a major portion of the treated TiCl$_4$ to separate a minor portion containing non-volatile precipitates therefrom, removing low boiling point impurities from said treated and evaporated TiCl$_4$ by a first fractional distillation and removing high boiling point impurities therefrom by a second fractional distillation, thereby to produce purified TiCl$_4$, heating the minor portions separated in the first and second mentioned evaporation steps to recover TiCl$_4$ therefrom and combining said recovered TiCl$_4$ with crude TiCl$_4$ at a stage prior to chemical treatment.

3. A process for the purification of crude titanium tetrachloride (TiCl$_4$) which comprises evaporating between 50% and 80% of said crude TiCl$_4$ to separate a minor portion thereof containing non-volatile solid materials, precipitating vanadium and other impurities from said evaporated TiCl$_4$ by means of a chemical treating agent, evaporating between 50% and 80% of the treated TiCL$_4$ to separate a minor portion containing non-volatile precipitates, removing low boiling point impurities from said treated and evaporated TiCl$_4$ by a first fractional distillation and removing high boiling point impurities therefrom by a second fractional distillation, thereby to produce purified TiCl$_4$, combining the minor portions separated in the first and second mentioned evaporation steps, heating said portions to recover TiCL$_4$ therefrom and combining said recovered TiCl$_4$ with crude TiCl$_4$ at a stage prior to chemical treatment.

4. A process for the purification of crude titanium tetrachloride (TiCl$_4$) which comprises evaporating a major portion of said crude TiCl$_4$ to separate a minor portion thereof containing non-volatile solid materials, precipitating vanadium and other impurities from said evaporated TiCl$_4$ by means of a chemical treating agent, evaporating a major portion of the treated TiCl$_4$ to separate a minor portion containing non-volatile precipitates, removing low boiling point impurities from said treated and evaporated TiCl$_4$ by a first fractional distillation and removing high boiling point impurities therefrom by a second fractional distillation, thereby to produce purified TiCl$_4$, combining the minor portions separated in the first and second mentioned evaporation steps heating said portions to recover TiCl$_4$ and to separate a dry residue therefrom, and combining said recovered TiCl$_4$ with crude TiCl$_4$, at a stage prior to chemical treatment.

5. A process for the purification of crude titanium tetrachloride (TiCl$_4$) which comprises evaporating a major portion of said crude TiCl$_4$ to separate a minor portion thereof containing non-volatile solid materials, precipitating vanadium and other impurities from said evaporated TiCl$_4$ by means of a chemical treating agent, evaporating a major portion of the treated TiCl$_4$ to separate a minor portion containing non-volatile precipitates, removing low boiling point impurities from said treated and evaporated TiCl$_4$ by a first fractional distillation and removing high boiling point impurities therefrom by a second fractional distillation, thereby to produce purified TiCl$_4$, combining the minor portions separated in the first and second mentioned evaporation steps and a major portion of the high boiling point impurities removed in the second fractional distillation, heating said combined portions to recover TiCl$_4$ therefrom and combining said recovered TiCl$_4$ with crude TiCl$_4$ at a stage prior to chemical treatment.

6. A process for the purification of crude titanium tetrachloride (TiCl$_4$) which comprises evaporating between 50% and 80% of said crude TiCl$_4$ to separate a minor portion thereof containing non-volatile solid materials, precipitating vanadium and other impurities from said evaporated TiCl$_4$ by means of a chemical treating agent, evaporating between 50 and 80% of the treated TiCl$_4$ to separate a minor portion containing non-volatile precipitates, removing low boiling point impurities from said treated and evaporated TiCl$_4$ by a first fractional distillation and removing high boiling point impurities therefrom by a second fractional distillation, thereby to produce purified TiCl$_4$, combining the minor portions separated in the first and second mentioned evaporation steps and about 90% of the high boiling point impurities removed in the second fractional distillation, heating said combined portions to recover TiCl$_4$ therefrom and combining said recovered TiCl$_4$ with crude TiCl$_4$ at a stage prior to chemical treatment.

References Cited in the file of this patent

UNITED STATES PATENTS

| | | |
|---|---|---|
| 2,224,061 | Pechukas | July 7, 1942 |
| 2,289,328 | Pechukas | July 7, 1942 |
| 2,345,214 | Pechukas | Mar. 28, 1944 |

OTHER REFERENCES

U. S. Bureau of Mines, Report of Investigations #4153 (December 1947), "Pilot Plant Distillation and Purification of Titanium Tetrachloride," by Stoddard et al., 40 pp.

"Chemical Engineers' Handbook," by John H. Perry, 3rd ed. (1950), McGraw-Hill, sections 7 (Evaporation) and 9 (Distillation . . . ).